(12) United States Patent
Nagle et al.

(10) Patent No.: US 10,586,011 B1
(45) Date of Patent: Mar. 10, 2020

(54) SYSTEM AND METHOD FOR PIN AUTOMATION FOR TOPOLOGY EDITING

(71) Applicant: Cadence Design Systems, Inc., San Jose, CA (US)

(72) Inventors: Dennis Nagle, Peabody, MA (US); Amit Kumar Sharma, Chelmsford, MA (US); Delong Cai, Shanghai (CN); Xuegang Zeng, Westborough, MA (US); Hui Qi, Shanghai (CN)

(73) Assignee: Cadence Design Systems, Inc., San Jose, CA (US)

( * ) Notice: Subject to any disclaimer, the term of this patent is extended or adjusted under 35 U.S.C. 154(b) by 105 days.

(21) Appl. No.: 15/928,627

(22) Filed: Mar. 22, 2018

(51) Int. Cl.
*G06F 17/50* (2006.01)

(52) U.S. Cl.
CPC ........ *G06F 17/5077* (2013.01); *G06F 17/505* (2013.01); *G06F 17/5036* (2013.01); *G06F 2217/02* (2013.01)

(58) Field of Classification Search
USPC ........................................ 716/139
See application file for complete search history.

(56) References Cited

U.S. PATENT DOCUMENTS

2017/0220721 A1* 8/2017 Toutant ............... G06F 17/5054

* cited by examiner

Primary Examiner — Eric D Lee
(74) Attorney, Agent, or Firm — Mark H. Whittenberger, Esq.; Holland & Knight LLP

(57) ABSTRACT

Embodiments include herein are directed towards a method for electronic circuit design. Embodiments may include displaying, at a graphical user interface, an electronic circuit design topology environment and allowing a user to select, create, or modify an entirely single pin topology, an entirely multi-pin topology, or a combination of a single pin topology and a multi-pin topology for one or more portions of the electronic circuit design topology environment. Embodiments may also include receiving a selection of a designated portion of the electronic circuit design topology environment and generating, at the graphical user interface, a first, pin-adjustable symbol in accordance with the selected topology at the designated portion.

20 Claims, 17 Drawing Sheets

700

SYSTEM AND METHOD FOR PIN AUTOMATION FOR TOPOLOGY EDITING

BACKGROUND

Today's printed circuit board ("PCB") designs are increasingly complex and make use of industry standards and interfaces (e.g., dual data rate ("DDRx"), High-Definition Multimedia Interface ("HDMI"), etc.). The interfaces contain scalable interconnectivity definitions. Schematic, topology, and even PCB layout environments have adapted to compressing connectivity into hierarchical elements like net groups and buses. However, while interconnects have evolved to display and manage hierarchy, in existing systems blocks or symbols in electronic circuit design topology editors are either single pin or multi-pin. In a single pin topology all symbols have predetermined pins, one for each connection. These topologies offer a view of all of the connectivity but are often very complicated and difficult to manage. Multi-pin topologies support blocks where the connections between blocks can be comprised of multiple signals. These topologies allow for entire interfaces to be captured but also require a protocol to define block to block connectivity and lack connectivity details.

SUMMARY

In one or more embodiments of the present disclosure, a computer-implemented method is provided. The method may include displaying, at a graphical user interface, an electronic circuit design topology environment and allowing a user to select, create, or modify an entirely single pin topology, an entirely multi-pin topology, or a combination of a single pin topology and a multi-pin topology for one or more portions of the electronic circuit design topology environment. The method may also include receiving a selection of a designated portion of the electronic circuit design topology environment and generating, at the graphical user interface, a first, pin-adjustable symbol in accordance with the selected topology at the designated portion.

One or more of the following features may be included. The method may include saving the generated first, pin-adjustable symbol for reuse in a second electronic circuit design topology environment. The method may also include allowing, at the graphical user interface, a merging of the first, pin-adjustable symbol pin with a second symbol pin in the same symbol. The merging may include graphically moving the first, symbol pin proximate the second symbol pin. The method may further include allowing, at the graphical user interface, an unmerging of the first, pin-adjustable symbol pin to the second symbol pin. The method may also include displaying the combination of the single pin topology and the multi-pin topology at the electronic circuit design topology environment. The method may further include automatically resolving one or more connections of the multi-pin topology and one or more connections of the single pin topology.

In one or more embodiments of the present disclosure a non-transitory computer-readable storage medium having stored thereon instructions that when executed by a machine result in the following operations is provided. Operations may include displaying, at a graphical user interface, an electronic circuit design topology environment and allowing a user to select, create, or modify an entirely single pin topology, an entirely multi-pin topology, or a combination of a single pin topology and a multi-pin topology for one or more portions of the electronic circuit design topology environment. Operations may also include receiving a selection of a designated portion of the electronic circuit design topology environment and generating, at the graphical user interface, a first, pin-adjustable symbol in accordance with the selected topology at the designated portion.

One or more of the following features may be included. Operations may include saving the generated first, pin-adjustable symbol for reuse in a second electronic circuit design topology environment. Operations may also include allowing, at the graphical user interface, a merging of the first, pin-adjustable symbol pin with a second symbol pin in the same symbol. The merging may include graphically moving the first, symbol pin proximate the second symbol pin. Operations may further include allowing, at the graphical user interface, an unmerging of the first, pin-adjustable symbol pin to the second symbol pin. Operations may also include displaying the combination of the single pin topology and the multi-pin topology at the electronic circuit design topology environment. Operations may further include automatically resolving one or more connections of the multi-pin topology and one or more connections of the single pin topology.

In one or more embodiments of the present disclosure, a system is provided. The system may include a computing device having at least one processor configured to display, at a graphical user interface, an electronic circuit design topology environment. The at least one processor may be further configured to allow a user to select, create, or modify an entirely single pin topology, an entirely multi-pin topology, or a combination of a single pin topology and a multi-pin topology for one or more portions of the electronic circuit design topology environment. The at least one processor may be further configured to receive a selection of a designated portion of the electronic circuit design topology environment. The at least one processor may be further configured to generate, at the graphical user interface, a first, pin-adjustable symbol in accordance with the selected topology at the designated portion.

One or more of the following features may be included. In some embodiments, the at least one processor may be further configured to save the generated first, pin-adjustable symbol for reuse in a second electronic circuit design topology environment. The at least one processor may be further configured to allow, at the graphical user interface, a merging of the first, pin-adjustable symbol pin with a second symbol pin in the same symbol. The merging may include graphically moving the first, symbol pin proximate the second symbol pin.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
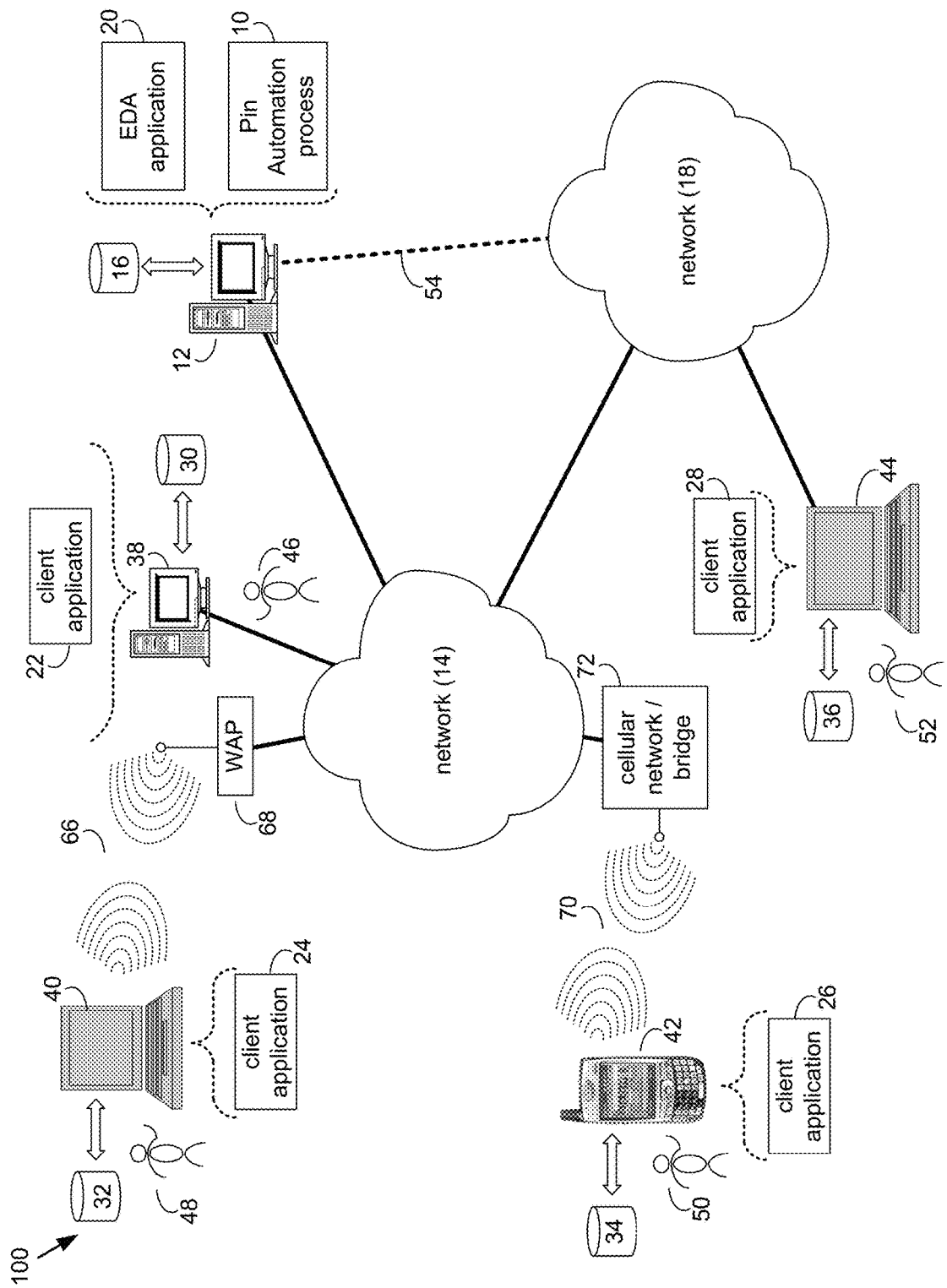
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 1, there is shown a pin automation process 10 that may reside on and may be executed by server computer 12, which may be connected to network 14 (e.g., the Internet or a local area network). Accordingly, embodiments of pin automation process 10 may be performed in whole or in part in the cloud. For example, using network 14, network 18, etc. Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, pin automation process 10 may reside on and be executed, in whole or in part, by a client electronic device, such as a personal computer, notebook computer, personal digital assistant, or the like.

The instruction sets and subroutines of pin automation process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Pin automation process 10 may be a stand alone application, or may be an applet/application/script that may interact with and/or be executed within EDA application 20. In addition/as an alternative to being a server-side process, pin automation process 10 may be a client-side process (not shown) that may reside on a client electronic device (described below) and may interact with an EDA client application (e.g., one or more of EDA client applications 22, 24, 26, 28). Further, pin automation process 10 may be a hybrid server-side/client-side process that may interact with EDA application 20 and an EDA client application (e.g., one or more of client applications 22, 24, 26, 28). As such, pin automation process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices

38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize pin automation process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
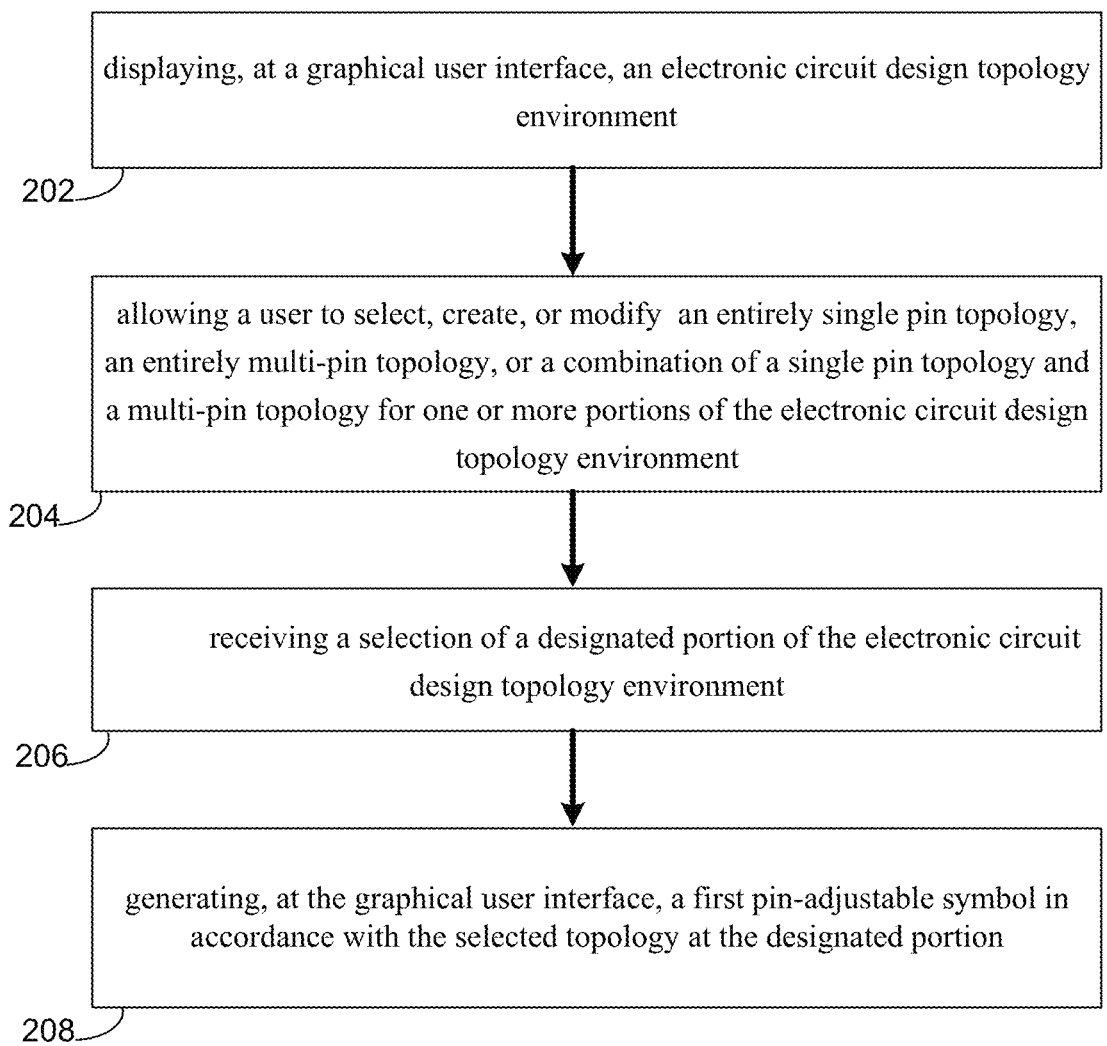
FIG. 2 is a flowchart depicting operations consistent with the pin automation process in accordance with an embodiment of the present disclosure.

Referring now to FIG. 2, an exemplary flowchart 200 depicting operations consistent with pin generation process 10 is provided. The method may include displaying (202), at a graphical user interface, an electronic circuit design topology environment. The method may further include allowing (204) a user to select, create, or modify an entirely single pin topology, an entirely multi-pin topology, or a combination of a single pin topology and a multi-pin topology for one or more portions of the electronic circuit design topology environment. The method may also include receiving (206) a selection of a designated portion of the electronic circuit design topology environment and generating (208), at the graphical user interface, a first, pin-adjustable symbol in accordance with the selected topology at the designated portion.

As used herein, the term "topology" may refer to an abstract graphical representation of an electrical circuit. For example, it can be a simple set of circuit elements for the purpose of generating a SPICE simulation netlist or a representation of a single net or interface and associated components in a Printed Circuit Board (PCB).

As used herein, the term "pin" may refer to a port on a symbol, it can reference a node in a circuit element or a pin on an actual component in a PCB.

As used herein, the term "single pin" may refer to a graphical representation of a symbol pin on the topology canvas where there is a one-to-one mapping between that graphical pin and a single pin on whatever the symbol represents. Anything connected to that pin represent a single connection.

As used herein, the term "multi-pin" may define a graphical representation where the pin on the topology canvas has a one-to-many mapping between that graphical pin to multiple pins on whatever the symbol represents. Anything connected to that pin may represent multiple connections.

As used herein, the term "symbol" may refer to a graphical representation of a circuit element such as an S-Parameter or a resistor. It can also represent an IC on a PCB and all of the logical connections for that IC.

In some embodiments, pin automation process 10 may include a topology environment where blocks or symbols have the flexibility to support both single and multi-pin capabilities. Accordingly, pins may be all one or the other or any mix of single and multi-pin with the added capabilities to merge and unmerge pins. As discussed above, blocks or symbols in topology editors are either single pin or multi-pin today. In a single pin topology all symbols have predetermined pins, one for each connection. These topologies offer a view of all of the connectivity but are often very complicated and difficult to manage. Multi-pin topologies support blocks where multiple connections may exist between blocks. These topologies allow for entire interfaces to be captured but also require a protocol to define block to block connectivity and lack connectivity details.

Existing topology applications generally include the following methods for generating a topology: open an existing saved topology, extract a portion (net or multiple nets) from a PCB design, create one from scratch. In these cases, symbols will either appear (from the existing or extracted topology) or be manually placed (for created topologies or edits to existing). Each of these symbols will have at least one but usually two or more pins. These pins are pre-defined as either single or multi-pins based on their library definition. In contrast, using the teachings of pin automation process 10 once these symbols are on the canvas, single pins may be changed to multi-pins and vice versa. As such, they may be referred to herein as "pin-adjustable". It should also be noted that any combination of pin types on any symbol may be employed.

Figure 3:
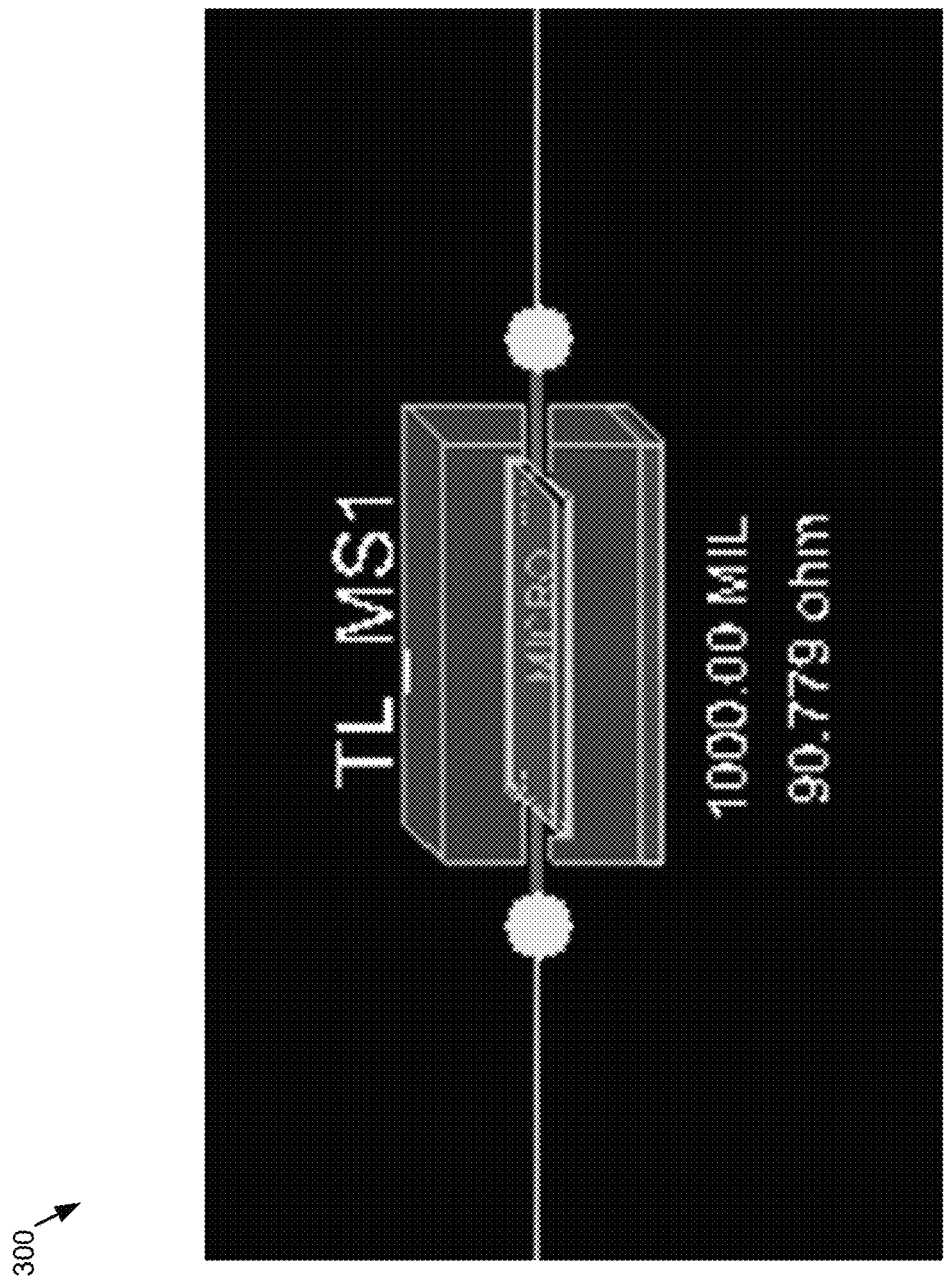
FIG. 3 is a diagram depicting an embodiment in accordance with the present disclosure.
Figure 4:
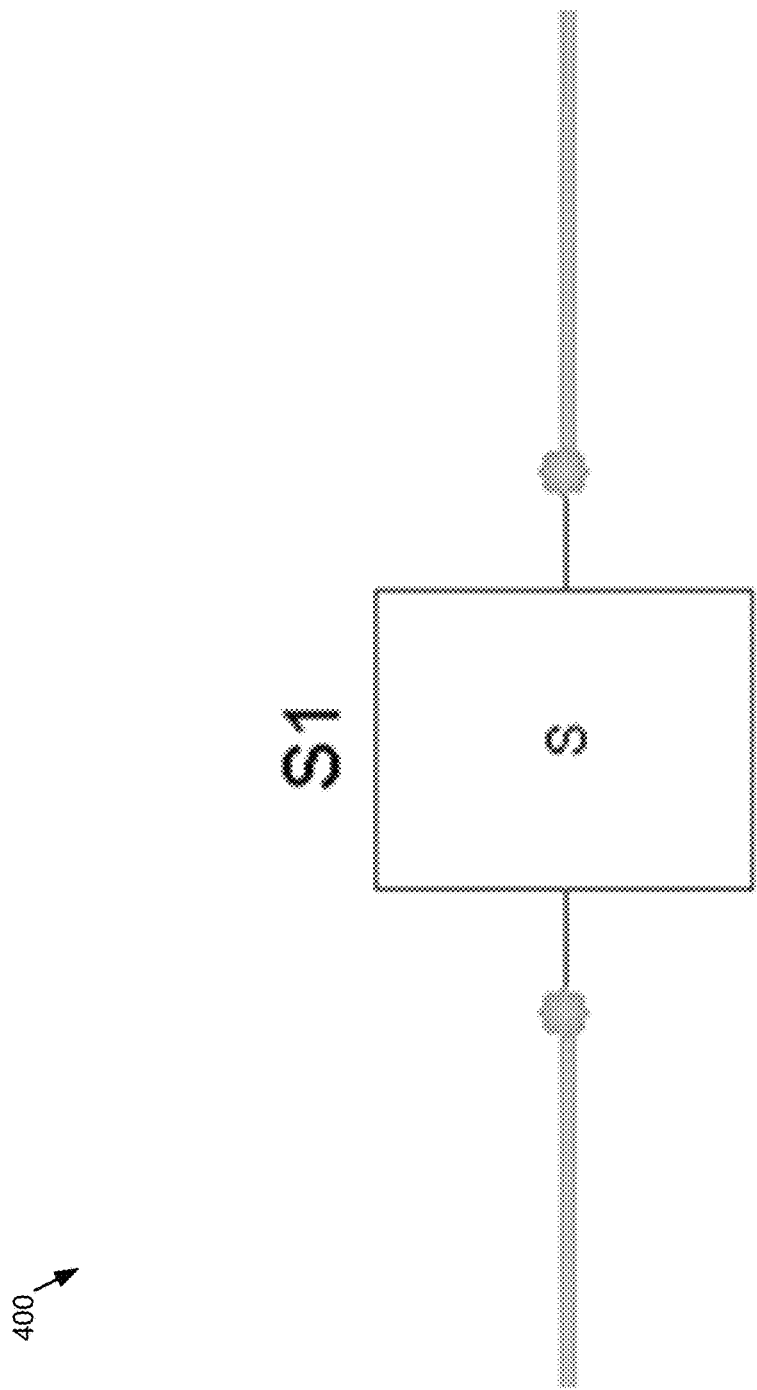
FIG. 4 is a diagram depicting an embodiment in accordance with the present disclosure.
Figure 5:
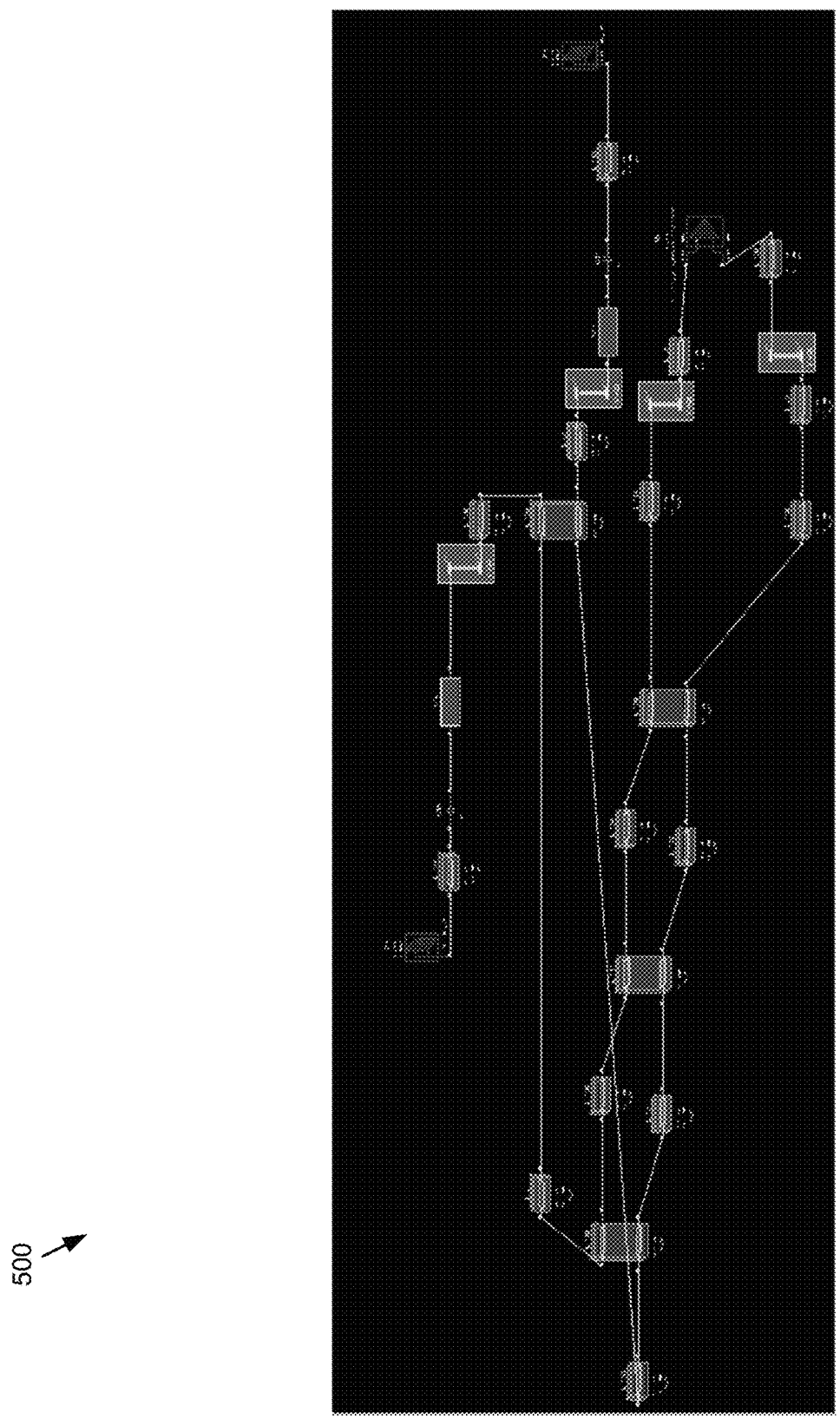
FIG. 5 is a diagram depicting an embodiment in accordance with the present disclosure.
Figure 6:
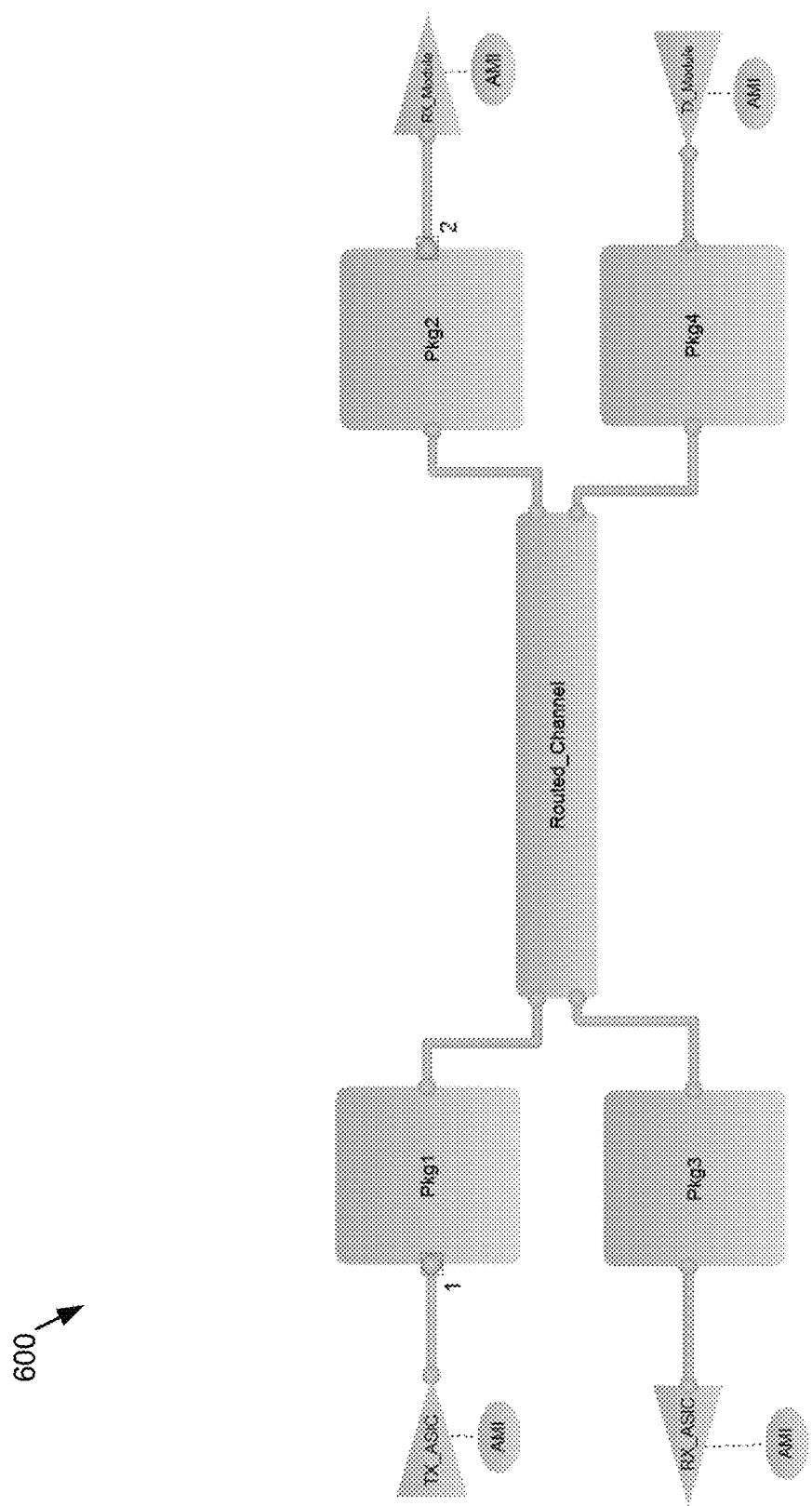
FIG. 6 is a diagram depicting an embodiment in accordance with the present disclosure.

Referring now to FIGS. 3-4, an example symbol is provided. In this example, symbol pin definitions may be limited and fixed to single or multi-pin definitions. This may be determined at the time the symbol is generated. In the example shown, pins and connections are shown as single entities. Referring also to FIG. 4, an embodiment showing pins and connections that are hierarchical with multiple entities. In some embodiments herein, blocks placed on an EDA canvas may have pre-determined pins representing one or more connections. In FIG. 3, the thin line represents a single connection to a single pin and in FIG. 4, the thick line represents multiple connections to a multi-pin Referring now to FIGS. 5-6, embodiments of single pin and multi-pin topologies are shown. FIG. 5 shows an example topology with only single pins is shown. In this example the single pin topology may give a complete view of all of the connectivity but is often complicated and unwieldy. In contrast, FIG. 6 shows an embodiment of a multi-pin topology where an entire interface is shown, however, the connectivity details are lacking. Model connectivity protocols may be required to define connectivity between blocks.

Embodiments of the pin automation process included herein are directed towards a topology environment merging single and multi-pin capabilities. Accordingly, the user is provided with ultimate flexibility where he/she determines which portions of the topology use which capabilities during wiring stage. In some embodiments of pin automation process 10, topologies can be entirely single pin or entirely multi-pin or a combination. Additionally and/or alternatively, in some embodiments the topology environment pin automation process 10 may allow for pins to be merged or broken out as desired. Graphical editing may allow for pins to be merged by simply moving a pin into another and unmerged using any suitable approach such as via a property editor. In some embodiments, a pin editor may allow for pins to be instantiated as single pins. Updated symbols may be saved and reused in other topologies.

In some embodiments, allowing a user to select an entirely single pin topology, an entirely multi-pin topology, or a combination of a single pin topology and a multi-pin topology for one or more portions of the electronic circuit design topology environment may include allowing a user to create, modify, and/or select.

Additionally and/or alternatively, in some embodiments, symbols that are entirely single pin or entirely multi-pin may be employed. This method allows that any symbol can have any combination of single and multi-pins and is unique in the ability to graphically generate the combination symbols right in the topology canvas. Alternate ways to achieve this could include going out to a symbol editing environment and creating the desired symbol prior to placing it on the canvas. This would mean that there are fixed versions of the symbol and the user chooses a version of that symbol before placing it on the canvas or swaps the symbol on the canvas for another version.

Accordingly, users are no longer limited to a single implementation of pins in the topology. In some embodiments, users may use any combination of single and multi-pins on any symbol/block. Topologies may include additional detail where needed but still have an additional level of hierarchy in the connectivity model between blocks to support multiple nets.

Figure 7:
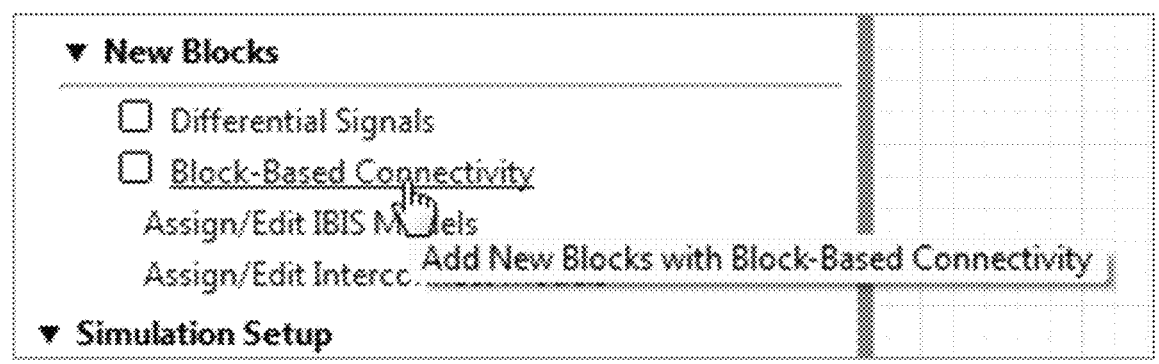
FIG. 7 is a diagram depicting a graphical user interface in accordance with the present disclosure.
Figure 8:
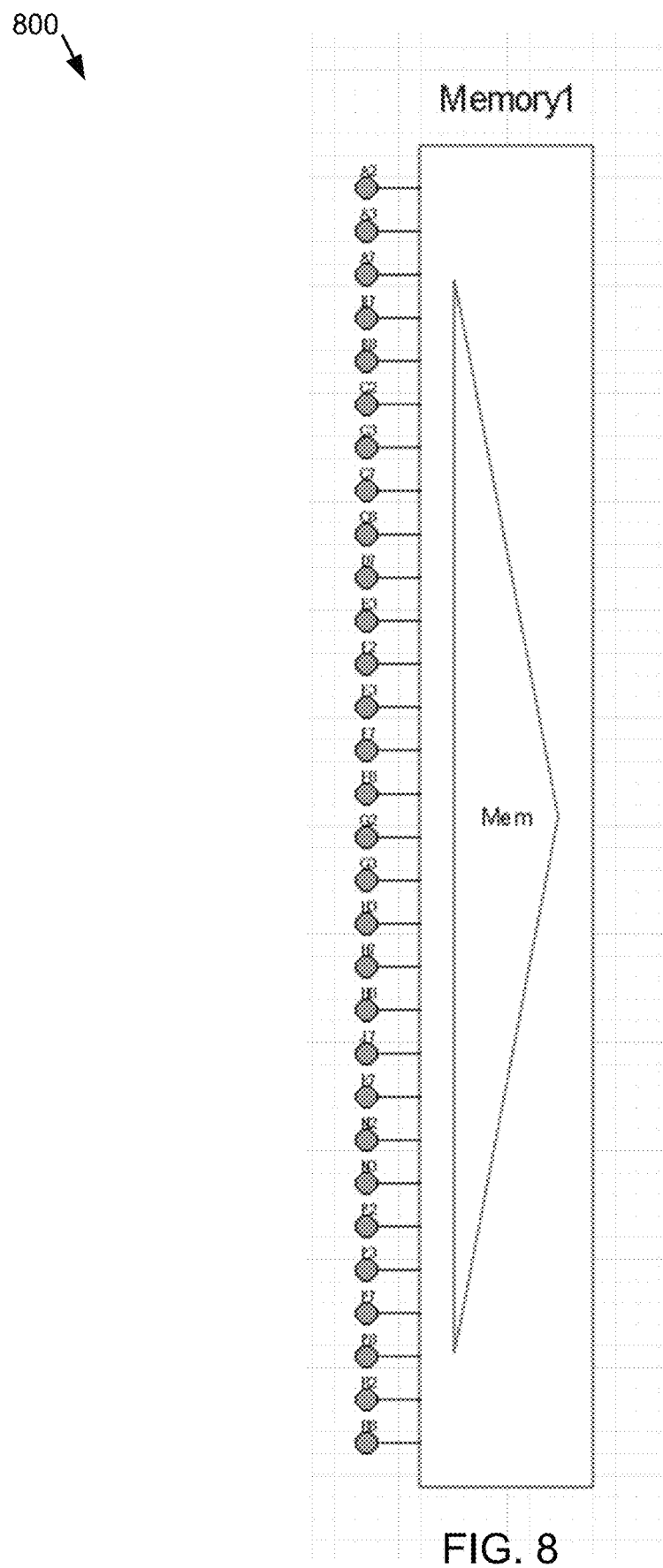
FIG. 8 is a diagram depicting a graphical user interface in accordance with the present disclosure.

Referring now to FIGS. 7-8, an embodiment consistent with pin automation process 10 is provided. This example depicts a portion of a graphical user interface 700 that provides a user with the ability to define modes for topology creation. For example, differential signals, adding new blocks with block based connectivity, etc. In this example, when the "block based connectivity" option is not selected, blocks may be added with single pins. FIG. 8 shows the resulting display.

Figure 9:
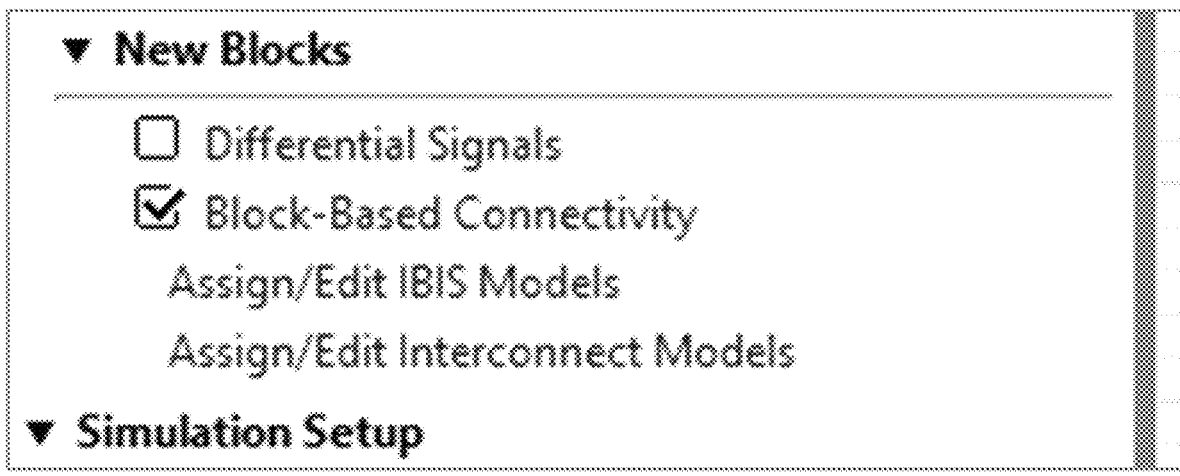
FIG. 9 is a diagram depicting a graphical user interface in accordance with the present disclosure.
Figure 10:
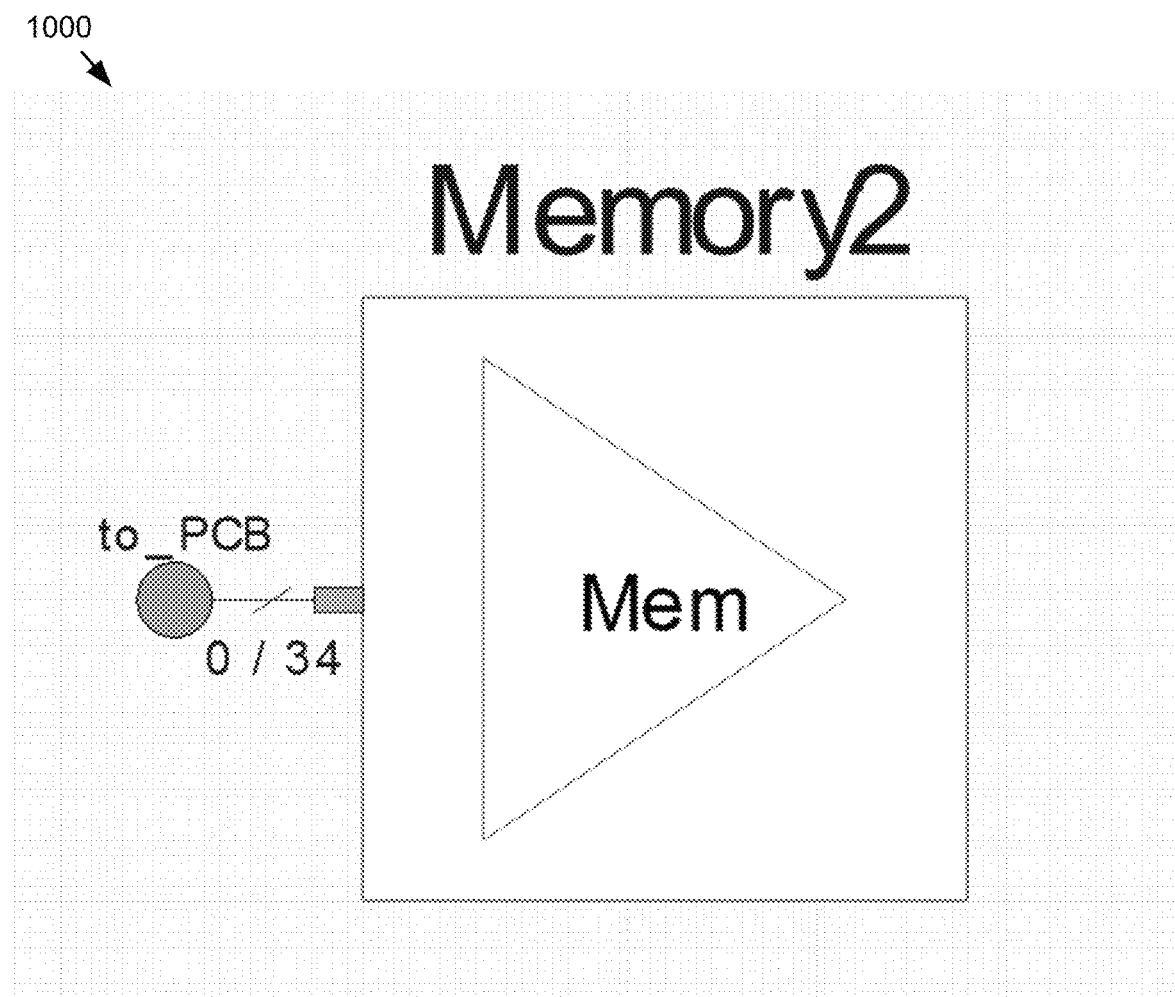
FIG. 10 is a diagram depicting a graphical user interface in accordance with the present disclosure.

In contrast, FIGS. 9-10 depict examples of a graphical user interfaces 900 and 1000 in accordance with pin automation process 10. In this example, when the "block based connectivity" option is selected, blocks may be added with hierarchical or multi-pins. FIG. 10 shows the resulting display. In this example, FIG. 10 shows the same block as FIG. 8, however, all 30 signals (plus 4 power/ground) are now contained on one multi-pin. Here, "0/34" on the pin indicates 0 connections to other blocks for the 34 signals on the pin.

Figure 11:
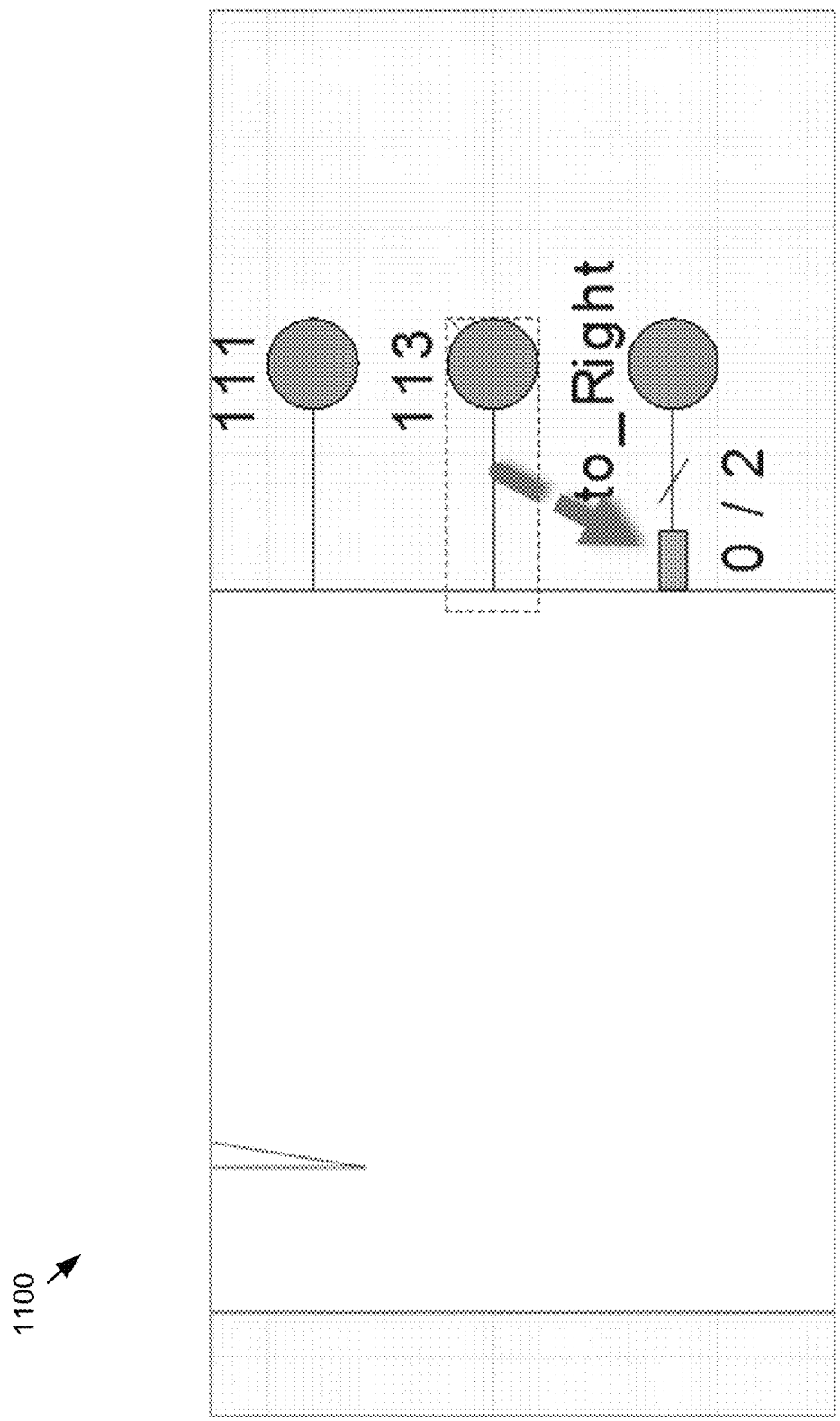
FIG. 11 is a diagram depicting a graphical user interface in accordance with the present disclosure.

Referring now to FIG. 11, an embodiment depicting a graphical user interface 1100 that may allow for the graphical selection of a pin. In operation, the user may select a pin and drag and drop that pin on another in order to merge, thus creating a multi-pin. In some embodiments, symbols may have any mix of single and multi-pins. Accordingly, graphical operations on the EDA canvas may allow for the creation of multi-pins from single pins and vice versa.

Figure 12:
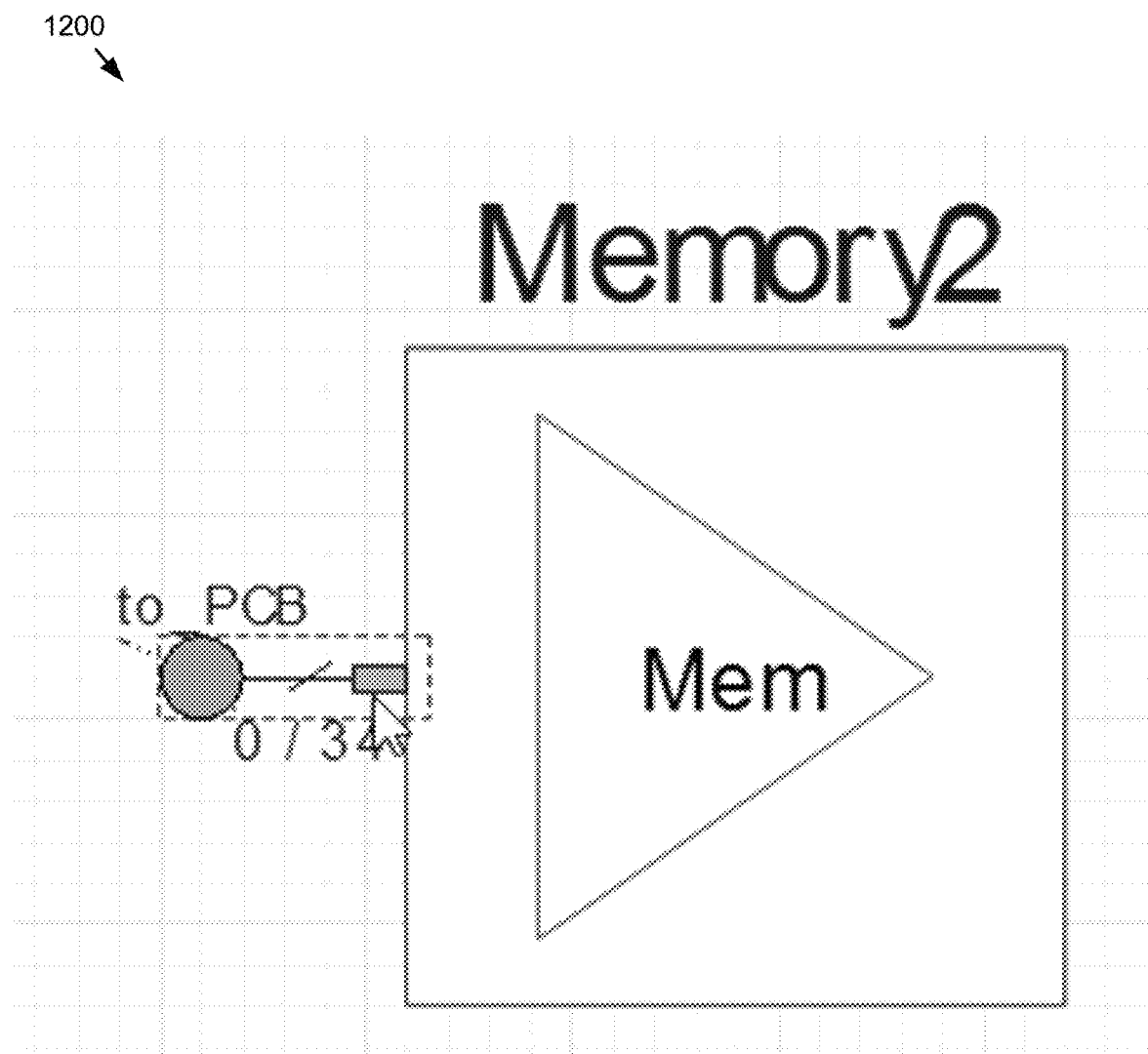
FIG. 12 is a diagram depicting a graphical user interface in accordance with the present disclosure.
Figure 13:
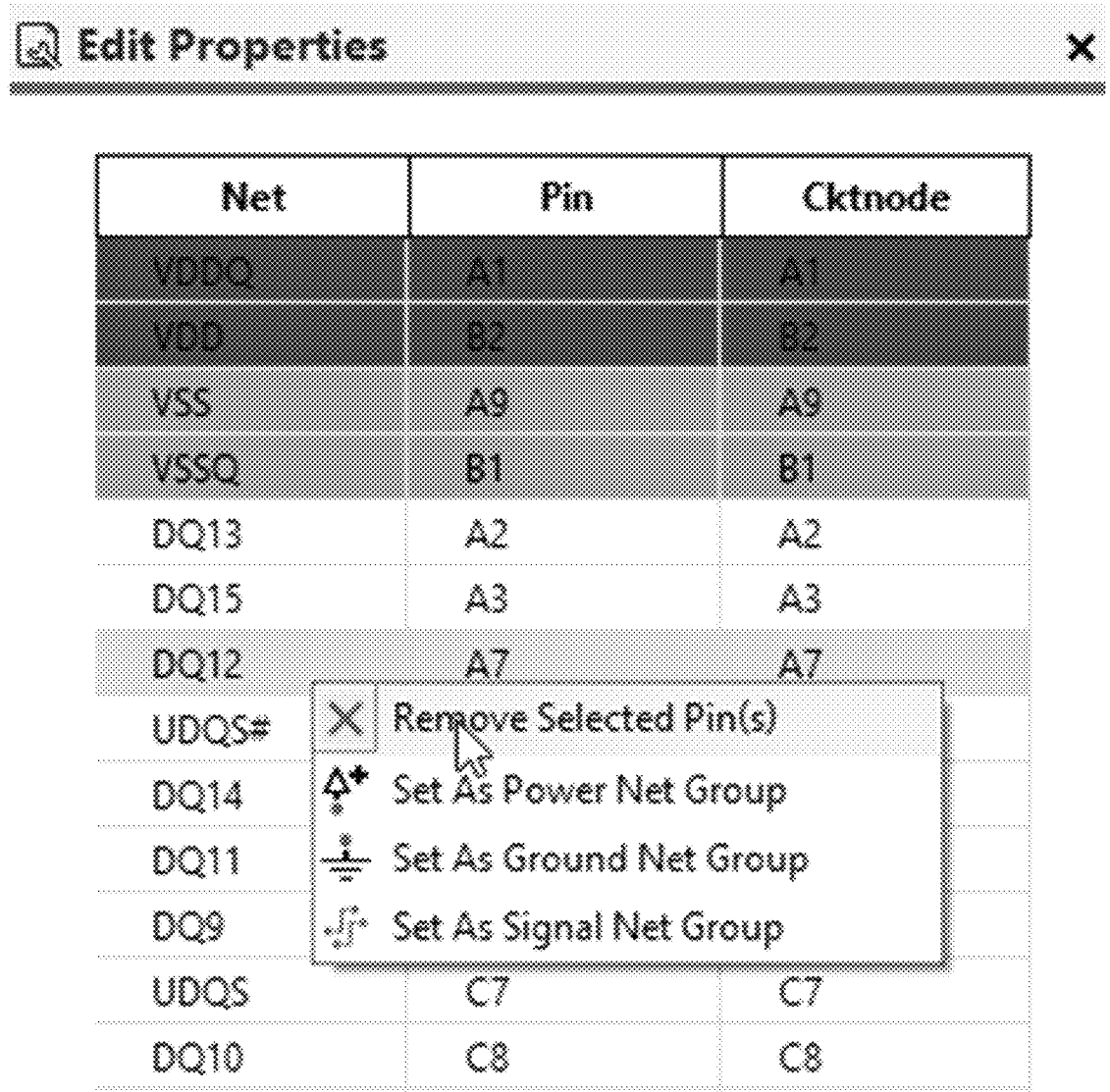
FIG. 13 is a diagram depicting a graphical user interface in accordance with the present disclosure.
Figure 14:
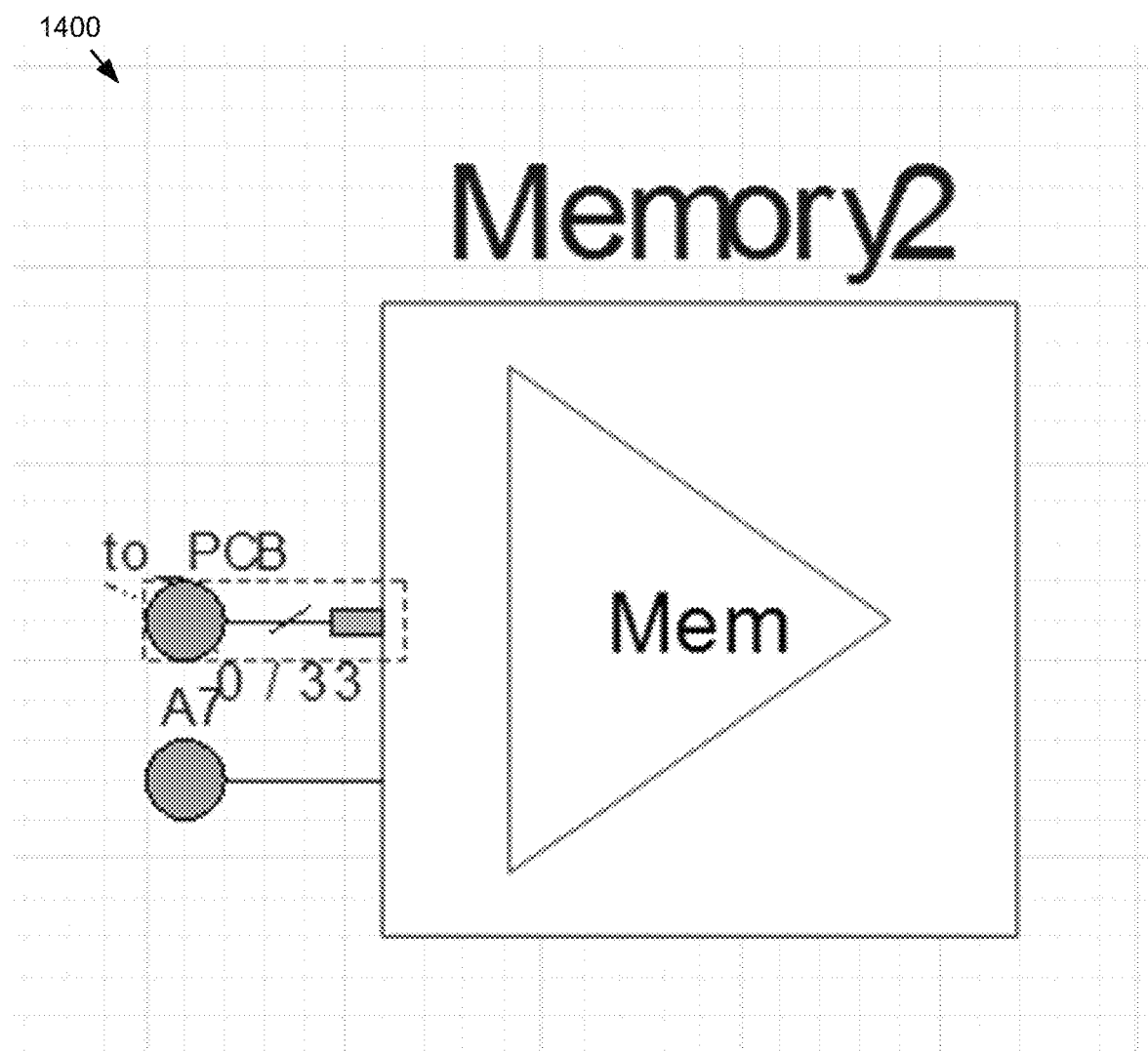
FIG. 14 is a diagram depicting a graphical user interface in accordance with the present disclosure.

Referring now to FIGS. 12-14, embodiments showing graphical user interfaces 1200-1400 consistent with pin automation process 10 are provided. In these figures an example showing the creation of single pins from multi-pins is provided. In operation, a user may select a multi-pin as shown in FIG. 12, which opens a property pane graphical user interface shown in FIG. 13 where pins can be removed, unmerged, and selected with right-mouse-button ("RMB"). Removed pins may be shown as single pins as depicted in FIG. 14.

Figure 15:
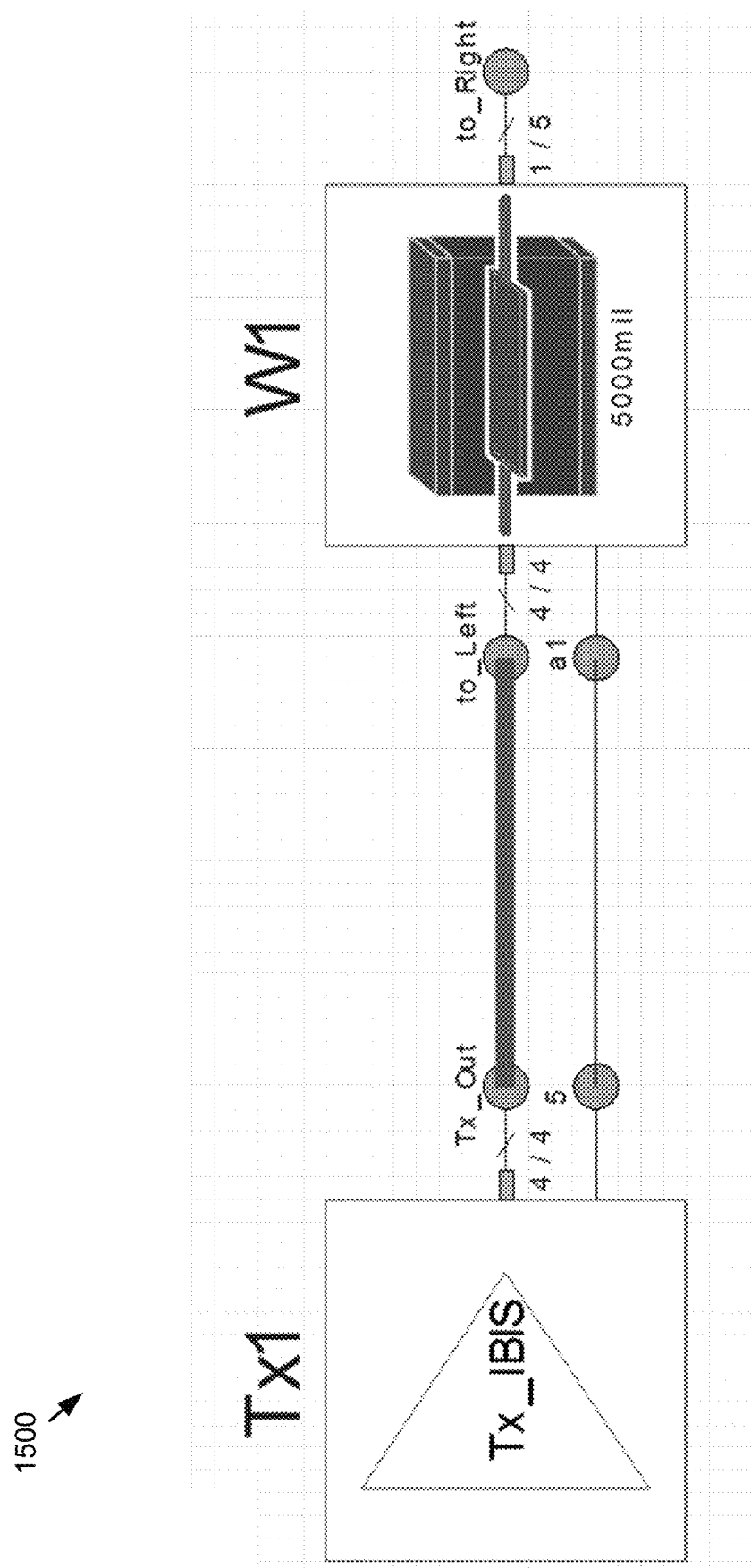
FIG. 15 is a diagram depicting a graphical user interface in accordance with the present disclosure.
Figure 16:
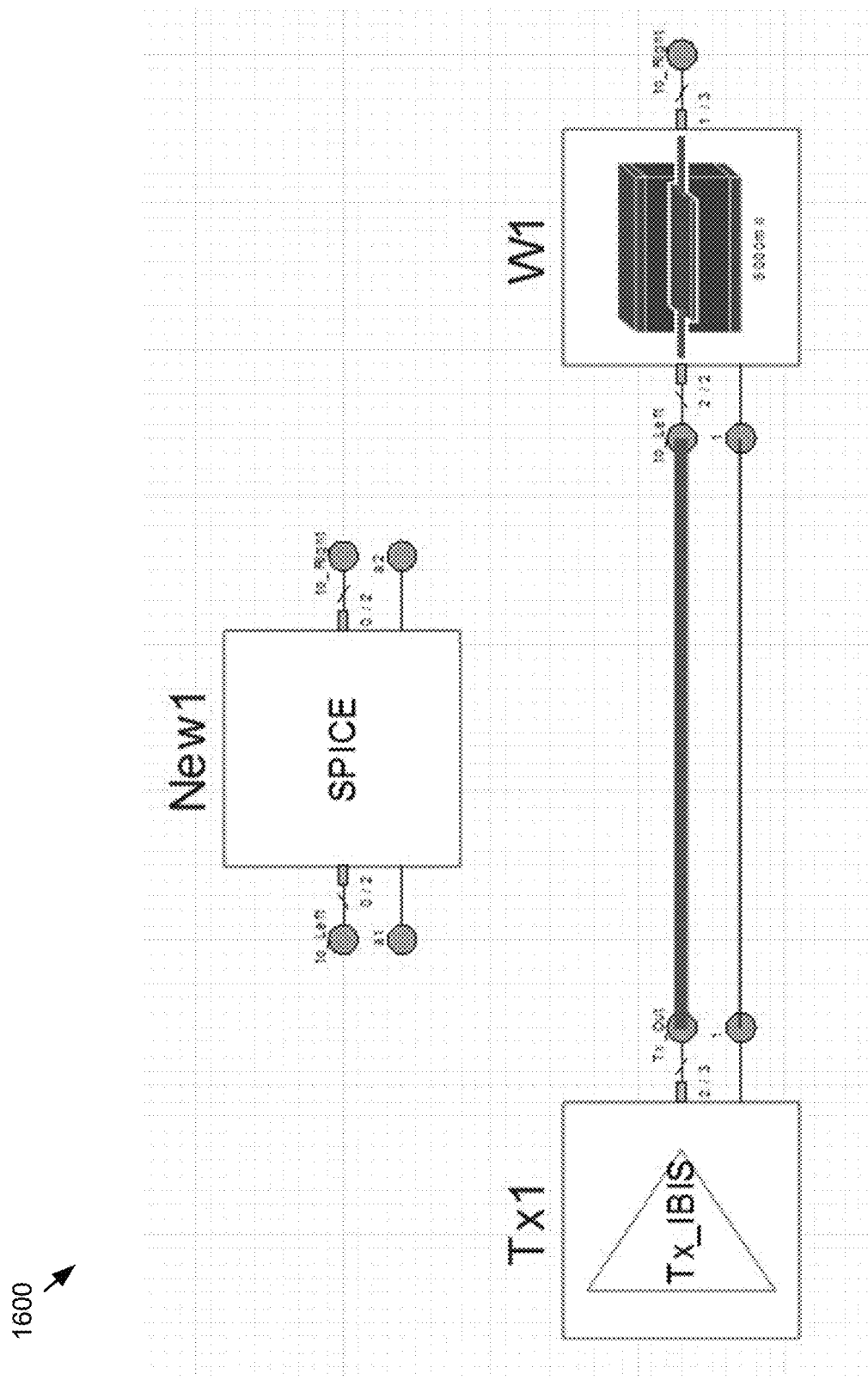
FIG. 16 is a diagram depicting a graphical user interface in accordance with the present disclosure.
Figure 17:
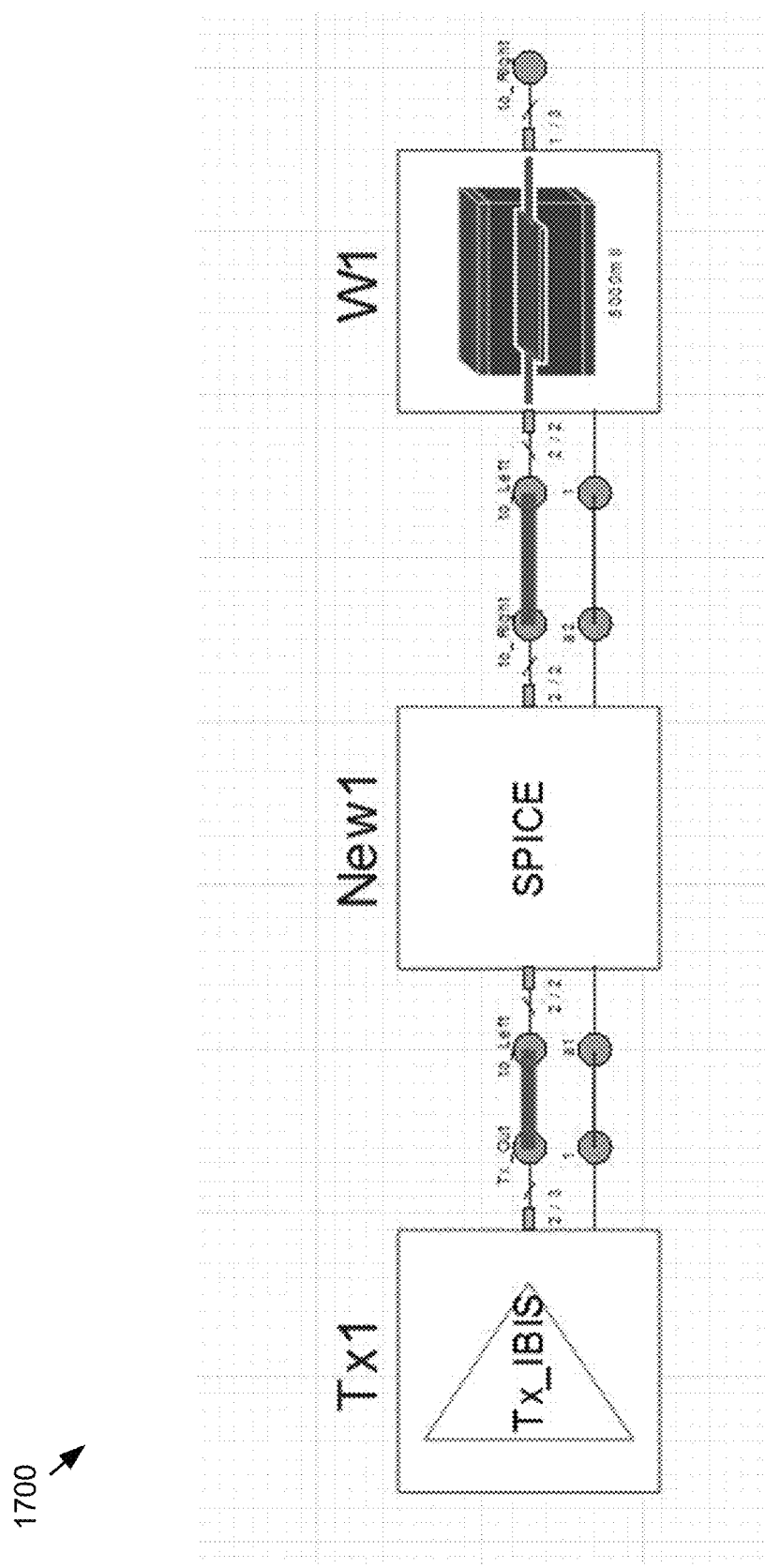
FIG. 17 is a diagram depicting a graphical user interface in accordance with the present disclosure.

Referring now to FIGS. 15-17, embodiments showing graphical user interfaces 1500-1700 consistent with pin automation process 10 are provided. In this particular example, a topology having a mix of single and multi-pins is shown. In this particular example, the diagram shows how pin automation process 10 may allow for block placement to automatically resolve single and multi-pin connections. These figures depict Tx1 and W1 are already connected on the canvas of an EDA application such as EDA application 20 of FIG. 1. In operation, a user may attempt to add block "New1" to the canvas. If the pin configuration matches, New1 may be placed on top of the existing connectivity and may automatically connect Tx1 and W1 as is shown in FIG. 17.

FIG. 16 represents a topology where Tx1 and W1 were already placed and connected in a topology and New1 was just added. All three symbols have some combination of single pins (Tx1.1, W1.1, New1.a1, New1.a2) and multi-pins (Tx1.Tx_Out, W1.to_Left, W1.to_Right, New1.to_Left, New1.to_Right). In FIG. 17, this is the result of moving New1 so that it is positioned on top of the existing connections depicted in FIG. 16. The result of this operation is that the single and multi-pins of New1 are now connected to Tx1 on the left and W1 on the right. The thick purple lines represent 2 connections (or signals) as indicated by the "2/x" indications on each multi-pin. The thin purple lines represent a single connection. Tx1 is a symbol representing an IBIS model for an IC, W1 represents a model of interconnect on a PCB, and New1 represents a SPICE model.

In the foregoing specification, embodiments of pin automation process 10 have been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer-implemented method comprising:
   displaying, at a graphical user interface, an electronic circuit design topology environment;

allowing a user to select, create, or modify an entirely single pin topology for a first portion of the electronic circuit design topology environment;

receiving a first selection of a first designated portion of the electronic circuit design topology environment;

generating, at the graphical user interface, a first, pin-adjustable symbol in accordance with the first selected topology at the first designated portion;

allowing a user to select, create, or modify an entirely multi-pin topology, or a combination of a single pin topology and a multi-pin topology for a second portion of the electronic circuit design topology environment;

receiving a second selection of a second designated portion of the electronic circuit design topology environment; and generating, at the graphical user interface, a second, pin-adjustable symbol in accordance with the second selected topology at the second designated portion.

2. The computer-implemented method of claim 1 further comprising:

saving the generated first, pin-adjustable symbol for reuse in a second electronic circuit design topology environment.

3. The computer-implemented method of claim 2 further comprising:

allowing, at the graphical user interface, a merging of a first, pin-adjustable symbol pin with a second symbol pin in a symbol.

4. The computer-implemented method of claim 3 wherein the merging includes graphically moving the first symbol pin proximate the second symbol pin.

5. The computer-implemented method of claim 3 further comprising:

allowing, at the graphical user interface, an unmerging of the first, pin-adjustable symbol pin with the second symbol pin.

6. The computer-implemented method of claim 1 further comprising:

displaying the combination of the single pin topology and the multi-pin topology at the electronic circuit design topology environment.

7. The computer-implemented method claim 6 further comprising:

automatically resolving one or more connections of the multi-pin topology and one or more connections of the single pin topology.

8. A non-transitory computer-readable storage medium having stored thereon instructions for generating an input/output model from a SPICE netlist that when executed by a machine result in the following operations:

displaying, at a graphical user interface, an electronic circuit design topology environment;

allowing a user to select, create, or modify an entirely single pin topology for a first portion of the electronic circuit design topology environment;

receiving a first selection of a first designated portion of the electronic circuit design topology environment;

generating, at the graphical user interface, a first, pin-adjustable symbol in accordance with the first selected topology at the first designated portion;

allowing a user to select, create, or modify an entirely multi-pin topology, or a combination of a single pin topology and a multi-pin topology for a second portion of the electronic circuit design topology environment;

receiving a second selection of a second designated portion of the electronic circuit design topology environment; and generating, at the graphical user interface, a second, pin-adjustable symbol in accordance with the second selected topology at the second designated portion.

9. The non-transitory computer-readable storage medium of claim 8 wherein operations further comprise:

saving the generated first, pin-adjustable symbol for reuse in a second electronic circuit design topology environment.

10. The non-transitory computer-readable storage medium of claim 8 wherein operations further comprise:

allowing, at the graphical user interface, a merging of a first, pin-adjustable symbol pin with a second symbol pin in a symbol.

11. The non-transitory computer-readable storage medium of claim 10 wherein the merging includes graphically moving the first symbol pin proximate the second symbol pin.

12. The non-transitory computer-readable storage medium of claim 11 further comprising:

allowing, at the graphical user interface, an unmerging of the first, pin-adjustable symbol pin with the second symbol pin.

13. The non-transitory computer-readable storage medium of claim 8 further comprising:

displaying the combination of the single pin topology and the multi-pin topology at the electronic circuit design topology environment.

14. The non-transitory computer-readable storage medium of claim 13 further comprising:

automatically resolving one or more connections of the multi-pin topology and one or more connections of the single pin topology.

15. A system comprising:

a computing device having at least one processor configured to display, at a graphical user interface, an electronic circuit design topology environment, the at least one processor further configured to allow a user to select, create, or modify an entirely single pin topology for a first portion of the electronic circuit design topology environment, the at least one processor further configured to receive a first selection of a first designated portion of the electronic circuit design topology environment, the at least one processor further configured to generate, at the graphical user interface, a first, pin-adjustable symbol in accordance with the first selected topology at the first designated portion, the at least one processor further configured to allow a user to select, create, or modify an entirely multi-pin topology, or a combination of a single pin topology and a multi-pin topology for a second portion of the electronic circuit design topology environment, the at least one processor further configured to receive a second selection of a second designated portion of the electronic circuit design topology environment, the at least one processor further configured to generate, at the graphical user interface, a second, pin-adjustable symbol in accordance with the second selected topology at the second designated portion.

16. The system of claim 15 wherein the at least one processor is further configured to save the generated first, pin-adjustable symbol for reuse in a second electronic circuit design topology environment.

17. The system of claim 15 wherein the at least one processor is further configured to allow, at the graphical user interface, a merging of a first, pin-adjustable symbol pin with a second symbol pin in a symbol.

18. The system of claim 17 wherein the merging includes graphically moving the first symbol pin proximate the second symbol pin.

19. The system of claim 18 wherein the at least one processor is further configured to allow, at the graphical user interface, an unmerging of a first, pin-adjustable symbol pin with the second symbol pin.

20. The system of claim 15 wherein the at least one processor is further configured to display the combination of the single pin topology and the multi-pin topology at the electronic circuit design topology environment.

* * * * *